United States Patent Office
3,535,866
Patented Oct. 27, 1970

3,535,866
PROCESS AND APPARATUS FOR PRODUCING CRIMPED YARNS
Motohiro Tsuruta, Hiroshiro Kimura, Akio Koshimo, Nagamasa Kanzaki, and Heiji Arimoto, Kyoto, Matafumi Ishibashi, Shiki-gun, and Katsumi Yasuzuka, Mitsumasa Hara, and Yoshinobu Furukawa, Kyoto, Japan, assignors to Nippon Rayon Co., Ltd., Kyoto, Japan
Filed Feb. 25, 1969, Ser. No. 802,009
Claims priority, application Japan, Feb. 29, 1968, 43/13,070; May 8, 1968, 43/30,657; May 28, 1968, 43/36,200; Sept. 12, 1968, 43/65,700; Dec. 5, 1968, 43/89,179, 43/89,180
Int. Cl. D02g 1/02, 1/04
U.S. Cl. 57—34       33 Claims

ABSTRACT OF THE DISCLOSURE

A process for producing a crimped yarn from a thermal-plastic synthetic yarn by heating a continuously traveling thermal-plastic synthetic yarn at or above the softening temperature of the yarn, placing the yarn in contact with a moving friction surface to which a jet of compressed air is directed to false-twist the yarn, and after heating, cooling the yarn at least below the secondary transition temperature thereof, and an apparatus for carrying out the aforesaid process at super high speeds.

BACKGROUND OF THE INVENTION

Field of the invention

The present invention relates to a process and an apparatus for producing crimped yarns and more particularly to a process and an apparatus for producing crimped yarns at a super high speed.

Description of the prior art

Heretofore, there have been proposed various processes for preparing crimped yarns. Among these processes, a process suitable for producing crimped yarns having excellent bulkiness and elasticity comprises false-twisting, a traveling thermal-plastic synthetic yarn and heat setting the yarn in the twisted state. (Hereinafter, such a conventional process of producing crimped yarns will be referred to as the "false-twisting type process of producing crimped yarns.") The conventionally employed false-twisting type processes for producing crimped yarns are divided generally into a type wherein a spindle is used and a type wherein a moving friction surface is used for false-twisting a traveling yarn when it is in contact with the surface.

However, such false-twisting is time-consuming and expensive. For example, the yarn speed in the conventional process wherein a spindle is used as a false-twisting means is at most about 120 meters per minute and also is at most about 200 meters per minute in the conventional process wherein a moving friction surface is used as the false-twisting means (in a case where the traveling yarn is a yarn of 70 deniers in total denier). If the yarn speed is higher than these values in the conventional processes, the yarn tends to suffer formations such as breaking out in fluff ball, slubs, etc. The crimped yarns prepared by employing conventional false-twisting processes of producing crimped yarns and a yarn speed higher than the aforesaid speeds, have numerous faults, such as poor bulkiness, low elasticity, poor crimp recovery, poor level dyeing properties, fluff balls and knobs.

Moreover, in conventional false-twisting processes of producing crimped yarns, the method wherein undrawn yarn is drawn and then the yarn is subjected to false-twisting continuously have not been employed for producing crimped yarn. This is the result of the fact that the yarn speed in conventional false-twisting processes for producing crimped yarns is considerably lower than a usual drawing speed (about 500 to 1,000 meters per minute). In other words, the combination of such a drawing step and the conventional false-twisting process of producing crimped yarns is meaningless from an economical standpoint.

Furthermore, the crimped yarns obtained by the conventional false-twisting process for producing crimped yarns have also the disadvantage that the filaments composing the yarn tend to be separated from each other. Such yarns perform poorly in many of the common textile operations, such as winding, weaving and knitting, due in the main to a looseness of structure which permits individual filaments to snag and break out, thus forming fluff balls, slubs, ringers, warps, stripbacks, or similar defects.

To overcome such disadvantages, conventionally, there is imparted a true twist to crimp yarns. However, such true twisting is time-consuming and expensive, and moreover, such a mechanical twisting often deteriorates the physical properties of yarns.

Also, in the conventional false-twisting processes of producing crimped yarns, untwisted yarns are usually overfed and wound on a package. In the aforeaid process, the untwisted yarns are overfed for winding the yarn softly on a package. However, although no trouble occurs when the yarn speed is low, it becomes difficult as the yarn speed is increased to wind the yarn softly. This is because the untwisted yarn is prevented from being packaged in the loose state by atmospheric resistance and the friction thereof with yarn guides which define the passageway for the yarn. When a crimped yarn is stored in a tightly wound state, the quality of the crimped yarn is reduced. Furthermore, as the weight of the yarn package is increased, the shape of the surface of the yarn package becomes uneven, whereby the yarn tension becomes unusually uneven for the yarn to run in the intermittently loose state, this results in breaking out of the yarn and makes continuous winding difficult.

OBJECT OF THE INVENTION

An object of the invention is to provide a process and an apparatus for producing a crimped yarn having excellent crimping characteristics at astonishing high speed.

Another object of this invention is to provide a process and an apparatus for producing a crimped yarn having excellent crimping characteristics from undrawn thermal-plastic synthetic yarn by combining an improved drawing step and crimping step.

The above and other objects of the present invention will become apparent from the specification and claims. Also, hereinafter the term "a yarn" denotes either a yarn composed of a mono-filament or a yarn composed of multi-filaments."

DETAILED DESCRIPTION OF THE INVENTION

According to the present invention, there is provided a process for producing crimped yarn which is characterized by the steps of:

(a) Heating a traveling thermal-plastic synthetic fiber yarn at or above the softening temperature of the yarn, (b) Cooling the heated yarn below the secondary transition temperature of the yarn, (c) False-twisting the yarn by contacting the yarn with a moving friction surface, and (d) Cooling forceably the moving friction surface, whereby the generation of heat is prevented.

We have made various attempts to break down the aforesaid limit of the yarn processing speed in the false-twisting type process of producing crimped yarns. In other words, the inventors have attempted to improve the processing steps in the false-twisting type process, such as, the heating method, the false-twisting method, the cooling method, and the winding-up method, etc. However, it was impossible to produce a crimped yarn having sufficient crimping characteristics.

Furthermore, we have continued research and, as a result thereof, have found that as the processing speed of the yarn is increased, the moving friction surface generates heat and the friction surface is deformed by the heat thus generated, which causes breaking of the yarn or filaments, welding of the filaments to each other (the welded portions are neither untwisted nor crimped), breaking of each filament (which forms fluff balls, slubs, ringers, etc.), undesirable crimping characteristics, poor level dying properties, and the like. Accordingly, we have attempted to cool forceably the moving friction surface and as a result thereof, a process has been found which can produce crimped yarns having excellent crimping characteristics at astonishing high speeds. In addition, the level dying property in the specification of the invention denotes a property whereby yarns are uniformly dyed.

In the process of this invention, a traveling thermal-plastic synthetic yarn is first heated at or above the softening temperature of the yarn and this can be carried out by passing the yarn through a heating zone having a sufficient length. However, the heating procedure can be carried out more advantageously by passing the yarn through the heating zone at least twice. The heating procedure of this invention has such merit that a compact and inexpensive heating means can be used and handling of the yarn becomes very easy.

In the present invention, any moving friction surface capable of false-twisting the traveling yarn brought into contact with the surface may be used, but it is desirable to use the surface of each end of a rotary tube having open ends. The use of such a rotary tube has the advantage that the traveling yarns can be placed in contact with the surface in a constant state, which results in the curve formed by the friction surface of each end of the rotary tube at a plane containing a central axis of the rotary tube is a part of a member of the group consisting of a circle, an ellipse, a parabola, a cycloidal curve, a power series curve, a hyperbola, a logarithmic curve, etc., and the curve is convexed to the central axis. By using such a curved surface of a rotary tube, the yarn can pass smoothly while being intimately in contact with the moving friction surface.

It is necessary that the friction surface which is in contact with the yarn be made of an elastic material having a high friction coefficient with the yarn. For example, the elastic material for forming the friction surface is preferably a synthetic rubber having a proper hardness, preferably of 70–96° measured by means of a hardness tester and having a high abraision resistance, such as, polyurethane, polybutadiene, polychloroprene, and the like.

The temporary twist imparted to yarn by false-twisting cannot be completely set if the heated and twisted yarn is not cooled below the secondary transition temperature of the yarn before the yarn is placed in contact with the moving surface. The heated yarn may be cooled as low as possible. However, economical considerations and handling problems require that the lower limit of the cooling temperature be preferably that of room temperature.

The cooling of the heated yarn may be carried out by placing the traveling yarn in contact with a wetted rotatable roller, the roller being immersed partially in a water bath in order to wet the yarn with the water, and thereafter, placing the yarn in contact with a yarn passageway provided on the outside of a pipe through which a cooling medium is passed. Any fluid may be used as the cooling medium passing through the aforesaid pipe but water is preferable from an economic standpoint. Furthermore, it is desirable to have a curved passageway for cooling the yarn which is securely in contact with it.

The cooling of the heated yarn may also be carried out by passing the yarn through running water. In the case where the heated yarn is passed through running water, the yarn is cooled and at the same time low polymers such as monomers and oligomers and impurities such as a textile oil (lubricating agent) contained in the yarn, are removed. It is helpful in order to obtain a crimped yarn having uniform quality, to remove the low polymers and also the impurities from the yarn. If these impurities are not removed before the traveling yarn has been placed in contact with the moving friction surface, they accumulate on the moving friction surface and vary the coefficient of friction of the friction surface to the yarn, which makes it difficult to impart a uniform temporary twist to the yarn. From this viewpoint, it is preferable to use running water containing a scouring agent such as ethylene glycol.

Furthermore, cooling the heated yarn may also be carried out more advantageously by passing the yarn through a flowing spray. In this case, the yarn is cooled and at the same time low polymers such as monomers and oligomers as well as impurities such as textile oil, etc., are removed from the yarn. Further, in this regard, since the yarn which passes in contact with the moving friction surface is rotated smoothly, the twisting of the yarn extends smoothly in a direction opposite to that of the traveling direction of the yarn, which is profitable for the production of uniformly crimped yarn. Also, to our astonishment, the yarn withdrawn from the spray is hardly wet. Therefore, the coefficient of friction of the friction surface in contact with the yarn is always kept constant. It is desirable, taking into consideration effectiveness and economy, to use a spray of water containing a scouring agent such as ethylene glycol and wherein the spray is formed by means of compressed air. In addition, inasmuch as the temperature of the water used in the cooling of this invention is lower, good results are obtained, however, sufficiently better results are obtained by using water which is at room temperature.

In the present invention, the moving friction surface is forceably cooled to prevent the surface from being heated by friction and this can be effectively achieved by blowing a jet of compressed air onto the moving friction surface. As mentioned before, when the moving friction surface is not forceably cooled it is difficult to produce crimped yarns having excellent crimped characteristics at very high speeds which are over the limit of speeds in conventional false-twisting processes for producing crimped yarns. When the traveling yarn, which is contact with the moving friction surface, is overheated there occur such troubles as welding of filaments to each other, breaking of the yarn or filaments, etc. Accordingly, the crimped yarn thus obtained has bad crimped characteristics, untwisted portions, cut ends of the filaments, fluff balls, slubs, etc.

Now, according to the process of the present invention a thermal-plastic synthetic yarn may be continuously supplied from the drawing step to the crimping step. By using the process of this invention, crimped yarns having good level dying properties and uniform crimped characteristics can be obtained at a low cost.

Usually, a yarn is supplied to textile operations such as texturing, weaving, knitting, etc., in the yarn package. As the speed of reeling off the yarn from the yarn package increases, the variation of yarn tension becomes higher. In the case of producing crimped yarns, this tension prevents crimped yarns from having good level dying properties and good crimped characteristics. On the other hand, it is possible, according to the process of this invention, to reel off a thermal-plastic synthetic undrawn yarn from a yarn package at a low speed, draw the yarn, and produce the crimped yarn with a speed several times as high as previous speeds. Accordingly, by carrying out the process of this invention, a crimped yarn having good level dying properties and uniform crimped characteristics can be obtained.

There has been provided a process wherein a crimped yarn, which is obtained by untwisting, is wound on a package while overfeeding it, but as mentioned above, various troubles occur in such a case when the yarn speed is high. However, good results such as a low yarn package density and a low $d$ value (these values will be defined below) can be obtained by passing the yarn untwisted to a stream of compressed gas flowing in the same direction as that of the yarn while overfeeding, whereby the yarn is advanced in the relaxed state by the jet of compressed gas and is then wound up. The fluid turbulence formed by the jet of compressed gas separates filaments composing the yarn into at least two groups of filaments and simultaneously interlaces the filaments groups, whereby they become individually and collectively twisted and entangled and converted into a yarn having a good low $d$ value. Also, a yarn package having low density can be obtained by winding the yarn in the relaxed state in a package.

According to the present invention, any gases which are harmless to the yarn may be employed, for example, air, nitrogen gas, etc. However, on considering the effectiveness and economic requirement, air is most profitable. The pressure of the gas is generally 0.3–7 kg./cm.$^2$, preferably 0.5–4 kg./cm.$^2$ in gauge (measured at the outlet of a tank). If the pressure of the gas is lower than 0.3 kg./cm.$^2$ the yarn cannot be cooled sufficiently, while if the pressure is higher than 7 kg./cm.$^2$ there occurs such undesirable results that the production cost has increased and the passageway of the traveling yarn is disturbed. Also, for the purposes of the present invention, it is unnecessary to use the pressure of a compressed gas that is higher than 7 kg./cm.$^2$.

The process of this invention can be carried out at a super high speed of form example 1,500 meters per minute, but upon considering economical profitability, it is desirable to carry out the present process at a yarn speed of from 600 to 1,000 meters per minute. The process of this invention may treat various filament yarns such as monofilament yarns and multifilament yarns. However, better results can be obtained by using thermal-plastic synthetic fibers such as polymide fibers, polyester fibers, polyacrylonitrile fibers, polyolefin fibers, and fibers of a copolymer of the monomers composing the aforesaid polymers.

The present invention is further concerned with an improved apparatus for producing crimped yarns. In other words, the aforesaid process of this invention can be advantageously carried out using an apparatus which is characterized by the following elements:

(a) A heating means for heating a traveling thermal-plastic synthetic yarn, (b) At least one rotary tube rotating around the central axis thereof, the yarn being false-twisted by contacting the friction surface of each end of the rotary tube, (c) A cooling means located between the heating means and a rotary tube for cooling the heated and twisted yarn before the yarn is untwisted, and (d) A compressed gas jetting nozzle placed facing the friction surface.

Figures 1, 2:
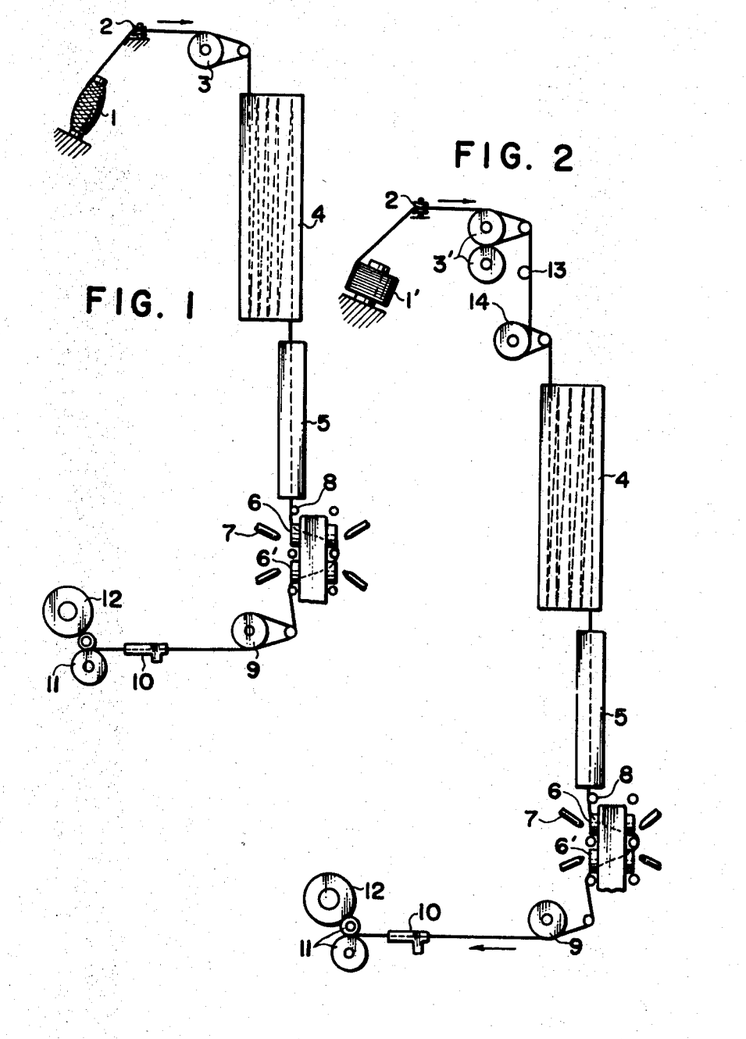
FIG. 1 illustrates schematically a preferred embodiment of an apparatus for carrying out the process of the present invention.
FIG. 2 illustrates schematically another embodiment of an apparatus for carrying out the process of the present invention.

The overall system of the present invention will now be explained. FIG. 1 shows schematically a preferred embodiment of the apparatus for carrying out the process according to the present invention. A drawn yarn from supply package 1 is processed through a tenser 2 and a feed roller 3. The yarn is passed at least twice through a heating means 4, whereby the yarn is heated at or above the softening temperature of the yarn. The yarn is then passed through a pair of rotary tubes 6 and 6' while in contact successively with the friction surfaces of the ends of the tubes whereby the yarn is false-twisted. In this case, the passageway of the yarn is defined by grooved guide rolls 8. The friction surfaces of each of the ends of a pair of rotary tubes 6 and 6' are prevented from being heated by friction with a travelling yarn by means of directing onto the friction surfaces a jet of compressed gas through compressed gas jet nozzle 7 facing the friction surfaces. In this case the heated and twisted yarn is cooled through cooling means 5 below the secondary transition temperature of the yarn before the yarn is placed in contact with the friction surface. After untwisting, the yarn is overfed by means of a delivery roller 9, passes through yarn relaxing and advancing means 10, and is wound up on a yarn package 12 by means of a pair of takeup rollers 11.

FIG. 2 shows schematically another preferred embodiment of the apparatus for carrying out the process of the present invention. An undrawn yarn is supplied from supplying package 1' into a pair of feed rollers 3' through a tenser 2 and thereafter is drawn by means of a draw pin 13 and a draw roller 14 into a drawn yarn. The drawn yarn is continuously fed to heating means 4 by means of the draw roller 14. The subsequent system is the same as that shown in connection with FIG. 1.

Figures 3, 4, 5, 6:
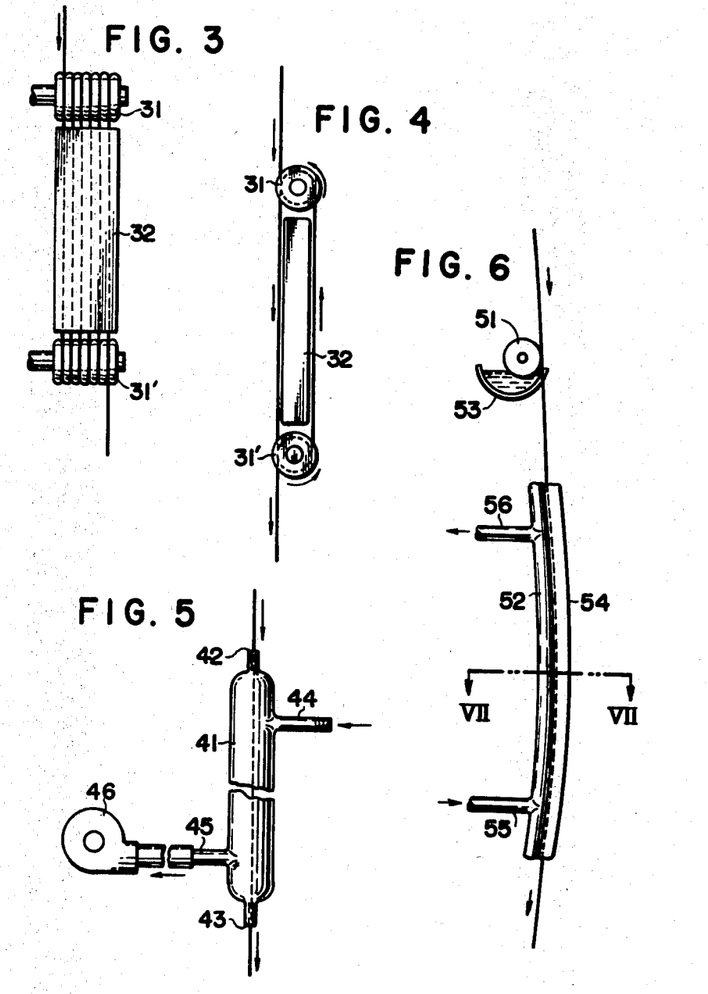
FIGS. 3 and 4 show respectively a front view and a side view of a preferred embodiment of the heating means according to the present invention.
FIG. 5 shows a front view of a preferred embodiment of the cooling means according to the present invention.
FIG. 6 shows a front view of another embodiment of the cooling means according to the present invention.

A preferable embodiment of the heating means is composed of a pair of rollers in a heater plate placed between the rollers. The embodiment of the heating means 4 is shown in FIG. 3 and FIG. 4 of the accompanying drawings, in which the heating means has a pair of grooved rollers 31 and 31' and a heating plate 32. The heating means 4 is usually covered by a cover box (not shown) having a yarn inlet and a yarn outlet. The heater plate 32 is placed between the grooved rollers 31 and 31'. Therefore, if the traveling yarn is introduced repeatedly from one grooved roller to the other grooved roller, the yarn passes at least twice through the heater plate along the surface thereof. Since the heating means as shown in the figures is constructed such that a yarn can pass therethrough at least twice, the length of the substantial heating zone can be varied by varying the number of the repeat even though the length of the heating means itself is short. Hence, the yarn passing at a high speed can be readily heated at or above the softening temperature of the yarn. Moreover, by using the aforesaid type of heating means, the apparatus for producing crimped yarns becomes quite compact.

It is desirable to rotate both the grooved rollers 31 and 31' at the same speed and in the same direction. Also, if necessary, the grooved rollers 31 and 31' may be heated. However, in this case, it is desirable that the surface temperature of grooved rollers 31 and 31' be at least 5° C. lower than the temperature of heater plate 32, otherwise, although the reason is not clear, the traveling yarn is liable to be stretched in the heated state, under which the production of a crimped yarn having uniform quality is difficult.

Another embodiment of the cooling means in the apparatus of the present invention is composed of a water passing conduit having a yarn inlet and a yarn outlet, a water supplying pipe for supplying water to the water passing conduit, and a water discharging pipe. This embodiment is best explained by referring to FIG. 5 in which the heating means consists of a water passing conduit 41 having a yarn inlet 42 and a yarn outlet 43 at the opposite sides thereof, a water supplying pipe 44 for supplying water to the water passing conduit 41 and a water discharging pipe 45 connected to a suction pump 46. Water is supplied from pipe 44 which then passes through at water passing conduit 41 and is discharged from the water discharging pipe 45 by means of a suction pump. Traveling yarn is cooled while passing through the water passing conduit 41.

An embodiment of the cooling means in the apparatus of the present invention is composed of:

(a) A rotatable roller immersed partially in a water bath, and (b) A cooling medium passing conduit having a yarn passageway at the outside surface thereof.

Figures 7, 8, 9:
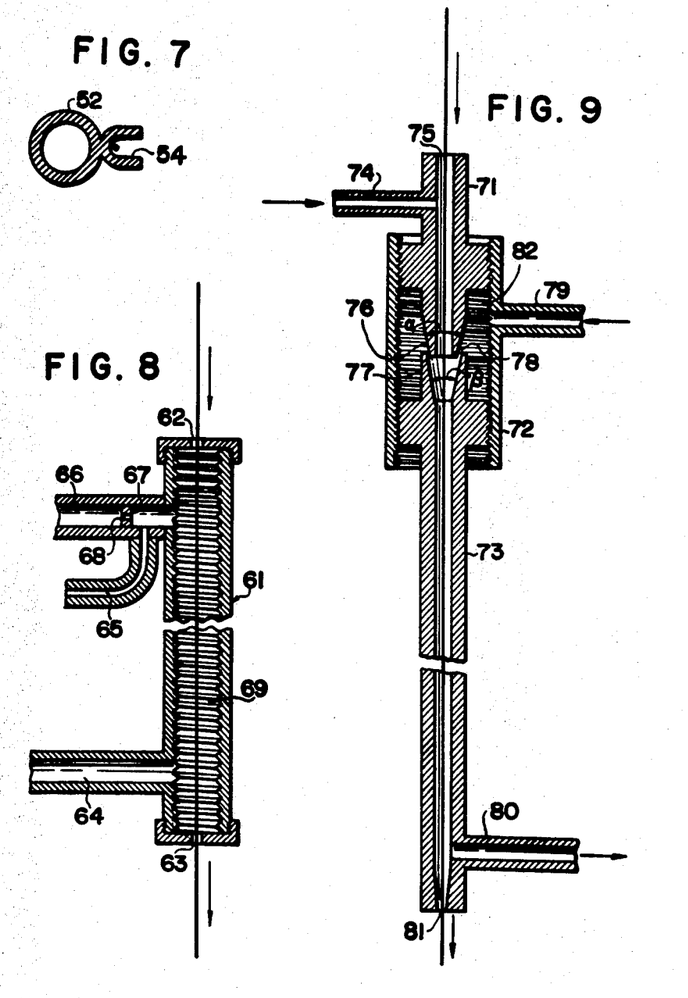
FIG. 7 shows a cross-sectional view of the means shown in FIG. 6 taken about lines a—a.
FIG. 8 shows a cross-sectional view of another embodiment for the cooling means of the present invention.
FIG. 9 shows a cross-sectional view of still another embodiment of the cooling means of the present invention.

This type of embodiment is shown in FIGS. 6 and 7. The cooling means is composed of a wetted rotatable roller 51 and a cooling medium passing conduit 52 having yarn passing groove 54 at the outer surface thereof and through the conduit 52 a cooling medium is circulated. The wetted rotatable roller 51 is rotated while immersed partially in water bath 53. The cooling medium passing through conduit 52 is provided with a cooling medium supplying pipe 55a and a cooling medium discharging pipe 56. The traveling yarn is wetted with water by means of the wetted rotatable roller 51 and thereafter it passes along the yarn passing groove 54.

Still another embodiment of the cooling means in the apparatus of this invention is composed of a spray-passing conduit having a yarn inlet and yarn outlet, a spray supplying pipe located at the inlet side of the conduit for supplying a spray into the conduit, and a spray discharging pipe located at the outlet side of the conduit for discharging the spray therefrom.

FIG. 8 illustrates still another embodiment of the cooling means in the apparatus of the present invention which is composed of a spray-passing conduit 61 having a yarn inlet 62 and a yarn outlet 63, a spray supplying pipe 66 located at the inlet side of the conduit for supplying a spray into the conduit, and a spray discharging pipe 64 located at the outlet side of the conduit for discharging the spray therefrom. This type of embodiment in which water supplied through water supplying pipe 65 is sprayed by means of a jet of compressed air from a nozzle hole 68 and plate 67 placed in a compressed gas supplying pipe 66, as illustrated in FIG. 8. The spray thus generated passes through a spray passing conduit 61 having a helical groove 69 on the inside wall thereof and discharged through a spray discharging pipe 64. A heated and twisted yarn is introduced into the spray passing conduit 61 through a yarn inlet 62 and discharged from the conduit through a yarn outlet 63. To our astonishment, the yarn withdrawn from the spray passing conduit 61 through the yarn outlet 63 is scarcely wetted with water.

A further embodiment shown in FIG. 9 of the cooling means in the apparatus of the present invention is composed of:

(a) A tubular connector provided with a compressed air supplying pipe, (b) A spray passing conduit screwed into the tubular connector to such an extent that at least the yarn and spray inlet thereof is positioned in the tubular connector, the inside space of the conduit at the inlet section is tapered to the traveling direction of the yarn, the inside diameter of the yarn outlet of the conduit is one capable of passing the yarns therethrough, and the spray passing conduit has a spray discharging pipe at the outlet side thereof, and (c) A yarn guiding conduit for guiding the yarn to the aforesaid spray passing conduit screwed into the tubular connector to such an extent that at least the yarn outlet of the conduit is positioned in the tubular connector with a narrow space between the outlet and the aforesaid inlet of the spray passing conduit, the outside surface of the yarn guiding conduit at the yarn outlet section is tapered in the traveling direction of the yarn, and the yarn guiding conduit has a water supplying pipe for supplying water into the conduit, the water thus applied is sprayed by a jet of compressed gas forced through the aforesaid narrow space and the spray thus generated passes through the spray passing conduit.

This embodiment will be explained by referring to FIG. 9 of the accompanying drawings. Water supplied through a water supplying pipe 74 is fed through a yarn supplying conduit 71 to a spray passing conduit 73. Compressed gas supplied through a compressed gas supplying pipe 79 is jetted into the spray passing conduits 73 through a chamber space formed by the inside wall of the tubular connector 72, the outer surface of the outlet section of the yarn guiding conduit 71 and the outer surface of the inlet section of the spray passing conduit 73 and then through a narrow space 78 formed between an outlet 76 of the conduit 71 and an inlet 77 of the spray passing conduit 73. Water supplied to the water supplying pipe 74 into the yarn guiding conduit 71 is sprayed by means of the jet of compressed gas jetted through the narrow space 78 and the spray thus generated is passed through the spray passing conduit 73 and discharged from a spray discharging pipe 80. The outside surface of the outlet section 76 of the yarn guiding conduit 71 is tapered to the traveling direction of the yarn. Further, the inside surface of the inlet section 77 of the spray passing conduit 73 is also tapered to the traveling direction of the yarn for forming the narrow space 78 between the tapered inside surface and the aforesaid tapered outlet 76. Also, the inside diameter of outlet 81 of the spray passing conduit is one capable of passing the yarn. The yarn guiding conduit 71 and the spray passing conduit 73 is connected via the tubular connector 72 by screwing them into the connector. Accordingly, the dimension of the narrow space 78 can be easily controlled. Thus, by properly selecting the dimension of the narrow space 78, the inclination degree α of the tapered outlet 76 of the yarn guiding conduit 71 and the inclination degree β of the inside surface of the inlet section 77 of the spray passing conduit 73, the spray passes always to the outlet end 81 of the spray passing conduit 73 without passing into the inlet 75 of the yarn guiding conduit 71.

False twisting of the traveling yarn in the present invention can be more advantageously carried out by using an embodiment of the apparatus which contains two rotary tubes. This embodiment will be explained by referring to FIGS. 10 and 11 of the accompanying drawings. A pair of rotary tubes 6 and 6' are supported rotatably by means of a support 15. The tubes are rotated in directions opposite each other by means of a traveling endless belt 16. Continuously traveling yarns are false-twisted by placing them in contact with the friction surfaces 17 and 17' and also 17" and 17'" at the opposite ends of the rotary tubes 6 and 6', respectively. In this case, the passage of the yarn is defined by grooved guide rollers 8a, 8b, 8c, 8d, 8e, and 8f. Each of the grooved guide rollers is supported rotatably by shaft 8' and each shaft 8' is mounted on a shaft-mounting member 8". The position of the mounted shaft can be changed as will be understood from FIG. 10. The amount of false-twisting imparted to the yarn can be determined easily by properly tensioning the yarn; the shape and property of the friction surfaces of the opposite ends of the rotary tube; the inside and outside diameters of the rotary tube; and the passageway of the yarn defined by the positions of the grooved guide rollers.

In addition, a pair of the rotary tubes can false-twist two yarns in different directions to each other. In this case, one yarn is introduced into the first rotary tube 6 from the left side thereof as viewed in FIG. 10, while the other is introduced into the rotary tube from the right side as viewed in FIG. 10. In other words, two yarns can pass separately through two passageways symmetrical to each other.

Figure 10:
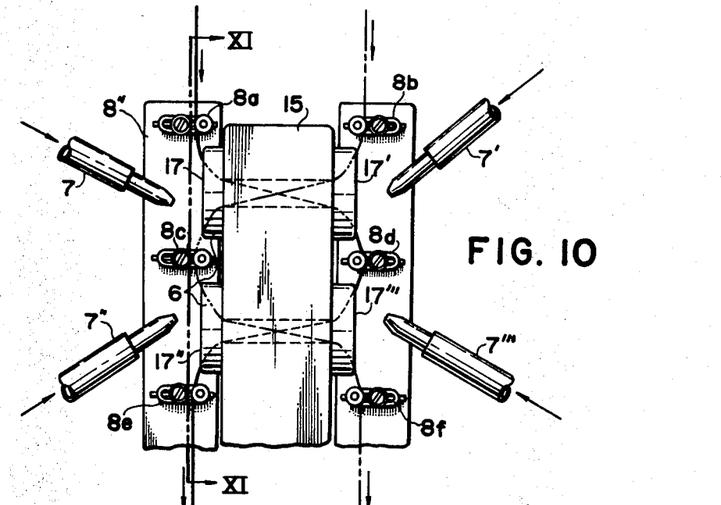
FIG. 10 shows a front view of a preferred embodiment of the rotary tubes, grooved guide and nozzles for blowing compressed air as used in the present invention.
Figure 11:
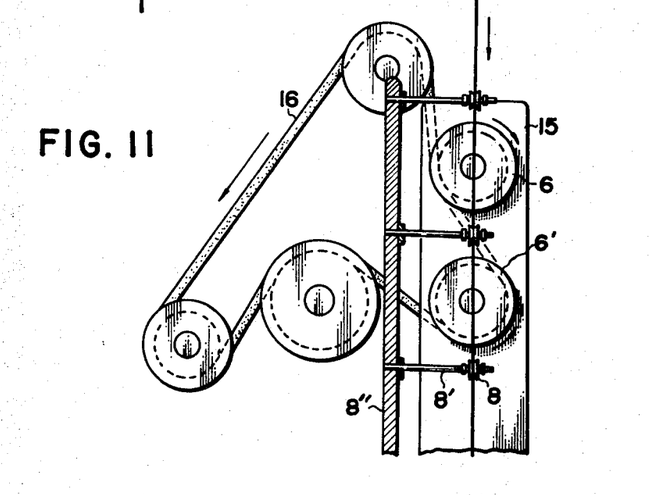
FIG. 11 shows a cross-sectional side view of the elements shown in FIG. 10 taken about lines b—b.

Facing the ends 17 and 17' of the rotary tube 6 and the ends 17" and 17'" of the rotary tube 6', are positioned as jet nozzles 7 and 7' and 7" and 7'" respectively for jetting a compressed gas or air through which jets of compressed gas are directed to the friction surfaces at the ends of the rotary tubes. But the jet of compressed gas, the friction surface is prevented from being heated by friction with the traveling yarn. Each of the jet nozzles 7, 7', 7" and 7'" is connected to a conduit for supplying compressed air.

It is desirable that the inside diameter of the jet nozzle, for jetting compressed air positioned to face the friction surface of the hollow rotary tube, be 0.05–3.00 mm. If the inside diameter of the nozzle is less than 0.05 mm., the friction surface is not sufficiently cooled, whereas, if the diameter is larger than 3.00 mm., the yarn is apt to cause rolling at the friction surface. When the yarn is being rolled on the friction surface, it is difficult to false-twist the yarn uniformly.

For the yarn guides which are positioned to define the passageway for passing yarn while it is in contact with the friction surfaces at the ends of the rotary tubes, any members may be employed if they do not generate a large amount of friction heat by contact with the traveling yarn. However, it will readily be understood that rotary groove guide rolls are desirable for this purpose.

Another embodiment of the apparatus of the present invention is used for producing crimped yarns having excellent crimped characteristics is characterized by the following elements:

(a) A heating means for heating a traveling thermoplastic synthetic fiber yarn, (b) At least one rotary tube rotating the center axis thereof, the yarn being false-twisted by contact with the friction surface on each end of the rotary tube, (c) A cooling means located between the heating means and the rotary tube for cooling the heated and twisted yarn before it is untwisted, (d) A compressed gas jetting nozzle placed facing the friction surface, and (e) A yarn relaxing and advancing means for advancing the untwisted yarn in a relaxed state, the yarn relaxing and advancing means jetting a compressed gas in the traveling direction of the untwisted yarn.

An embodiment of the aforesaid yarn relaxing and advancing means used in the apparatus of the present invention is composed of, for example, a compressed gas supplying pipe, gas passing conduit through which the compressed gas supplied from the aforesaid compressed gas supplying pipe passes to the outlet, and a yarn guiding pipe for guiding a traveling yarn into the gas passing conduit wherein at least a part of the pipe is positioned in the gas passing conduit.

This embodiment of the yarn relaxing and advancing means will be described referring to the embodiments shown in FIG. 13. The yarn relaxing and advancing means is composed of a compressed gas supplying pipe 91, a gas passing conduit 92, and a yarn guiding pipe 93. Outlet 94 of the yarn guiding pipe 93 is positioned in the gas passing conduit 92. A compressed gas is supplied to the gas supplying pipe 91 to the gas passing conduit 92 and out of outlet 95 of the gas passing conduit 92. The traveling yarn guided through the yarn guiding pipe 93 in the gas passing conduit 92 passes through the gas passing conduit 92 in a tension state but is relaxed when it is withdrawn from the outlet 94 and advanced in the relaxed state.

Another embodiment of the yarn relaxing and advancing means of the apparatus of the present invention comprises:

(a) A tubular connector having a compressed gas supplying pipe, (b) A compressed gas passing conduit screwed into the tubular connector to such an extent that at least the yarn and compressed gas inlet thereof, is positioned at the inside of the tubular connector, the inside surface of the compressed gas passing pipe at the inlet section being tapered to the traveling direction of the yarn, and (c) A yarn guiding conduit for guiding a yarn to the compressed gas passing conduit, the outside surface of the yarn guiding conduit at the outlet section, being tapered to the traveling direction of the yarn, the yarn supplying pipe being screwed into the tubular connector to such an extent that at least the outlet section thereof is positioned at the inside of the tubular connector with a narrow space between the outlet and the inlet of the compressed gas passing conduit.

This embodiment of the yarn relaxing and advancing means will be explained by referring to FIG. 14. The yarn relaxing and advancing means shown in FIG. 14 consists of a tubular connector 101, a compressed gas passing conduit 102, and a yarn guiding pipe 103. The tubular connector 101 is provided with a compressed gas supplying pipe 107. The inside surface of the inlet 104 of the compressed gas passing pipe 102 is tapered to the traveling direction of the yarn. The compressed gas passing pipe 102 is screwed into the tubular connector 101 to such an extent that at least the inlet 104 thereof is positioned at the inside of the tubular connector 101. The outside surface of the outlet 105 of the yarn guiding conduit 103 is tapered to the traveling direction of the yarn. Also, the yarn guiding conduit 103 is screwed into the tubular connector 101 so that a narrow space 106 is formed in the tubular connector 101 between the tapered outer surface of the outlet 105 and the tapered inside surface of the inlet 104 of the gas passing pipe 102.

Therefore, as will be understood from the above explanation, the dimension of the narrow space 106 may be varied as desired. By properly selecting the dimensions of the narrow space 106 (the inclination angle $\alpha'$ of the tapered outer surface of the outlet 105 of the yarn guiding conduit 103, and the inclination angle $\beta'$ of the inside surface of the inlet 104 of the compressed gas passing conduit 102), the compressed gas always passes to the outlet 110 of the compressed gas passing conduit 102 without passing to the inlet 109 of the yarn guiding conduit 103 and then is forced out of the outlet 110. The yarn, guided into the compressed gas passing conduit 102 from the yarn guiding conduit 103 which passes through the compressed gas passing conduit 102 in a tension state, is relaxed when it is withdrawn from the outlet 110, and is advanced in the relaxed state.

When at least two crimped yarns are passed together through the yarn relaxing and advancing means, the filaments composing the yarns are interlaced with each other at random by the turbulence of the gas at the outlet of the yarn relaxing and advancing means. That is, by the yarn relaxing and advancing means shown above, a unitary textured strand can be obtained from at least two crimped yarns without true-twisting. By passing two crimped yarns each having torque of opposite directions through the yarn loosening and advancing means, a unitary textured strand having no apparent torque can be obtained without true-twisting.

The crimp elongation and the crimp elasticity of the yarn obtained is determined by the following measurements:

The upper end of a sample yarn is fixed by means of a clip and hung with a load of 2 mg./denier on the lower end thereof. After 2 minutes, the distance $a$ from the upper end to the lower end is measured. Thereafter, a load of 1/10 g./denier is further loaded on the lower end of the yarn and after 30 seconds, the distance $b$ between the upper end and the lower end is measured. Immediately after the measurement, these loads are released. After 2 minutes, a load of 2 mg./denier is loaded on the lower end of the yarn, and after 30 seconds, the distance $c$ from the upper end to the lower end is measured. The above set forth measurements are repeated 20 times. The crimp elongation is shown by the average value of $$\left(\frac{b-a}{a} \times 100\right)$$

and the crimp elasticity thereof is shown by the average value of $$\left(\frac{b-c}{b-a} \times 100\right)$$

The crimp contraction of the yarn is determined by the following measurements:

The crimped yarn is wound 10 times around a reel having a peripheral length of 40 cm. under the tension of 10 mg./denier to obtain a sample hank. The sample hank is taken out of the reel and allowed to stand for a long period of time to relax it. The sample hank is then hung on a fixed hook and a load of $$\left[\left(\frac{2}{1000} \times 20 + \frac{1}{10} \times 20\right) \times \text{total deniers of yarn}\right] g.$$

is loaded on the sample. The sample is immersed in water of 20° C. ±2° C. in the loaded state and after 2 minutes, the hank length $a$ is measured. Directly after measuring the hank length $a$, the load of ($\frac{1}{10} \times 20 \times$ total deniers of yarn) g. is removed. After 2 minutes, a hank length $b$ is measured. The same measurement as set forth above is repeated 20 times.

The crimp contraction is shown by the average value of $$\left(\frac{a-b}{a} \times 100\right)$$

In the following examples and tables, the degree of separation of the yarn obtained is designated as the value $d$ (a low $d$ value means a high cohesion), which is determined in the following manner.

A yarn sample about 2 meters in length is hung by fixing its upper end and by loading its lower end with a load of 0.2 gram per denier. A hook having a weight of (deniers of monofilament × ⅗) grams is then inserted at its upper end. After the hook moves downwardly and stops, the distance of the movement of the hook is measured. Similar measurements are repeated several times. From the value obtained, there is yielded an arithmetic mean value representing the value $d$.

The apparent density of the yarn package obtained wound on a bobbin is determined by the following measurements.

An apparent volume v. (cm.³) of the yarn package is first measured. Then, the weight w. (g.) of the yarn package is measured. The apparent density of the yarn package is then shown by W/V (gram/cm.³). A yarn package having a low apparent density maintains its crimp characteristics for a long period of time.

The level dyeing property of the yarn is shown by the color chart determined as follows:

(1) Fifty yarn samples each having a length of about 50 meters are prepared by random sampling. These samples were knitted by means of a circular knitting machine of 220 in whole needle numbers and having a diameter of 3.5 inches to provide 50 knitted fabric samples. These fabric samples are then sufficiently scoured and soaped.

(2) These fabric samples are then dyed and thereafter dried sufficiently (see the next note).

(3) With the naked eye, a pair of fabric samples picked up from the fifty dyed fabric samples are compared with each other by means of a grey scale for assessing the change in color. Similar comparing tests are repeated several times to select the most deeply dyed fabric sample and most lightly dyed fabric sample. These two samples thus selected are compared with each other by means of a grey scale for assessing the change in color to determine the color chart showing the color difference between them.

Grey scale is a standard scale used for measuring the discoloring and fading of the dyed samples or materials and consists of grey color chart sets of #5 to #1, each of which is a combination of two grey color charts. That is, the grey color chart set #5 consists of two grey color charts which are of achromatic color and having a tristimulus value of 12±1%, and each of the grey color chart sets of #4 to #1 consists of the same chart as that of the grey color chart set #5 and a chart having a color difference shown in Table 1 by the following Adams' color difference equation.

$$\text{Color difference} = 40\{[0.23\Delta Vr]^2 + [\Delta(Vx-Vr)]^2 + [0.4\Delta(V_z-V_y)]^2\}^{0.5}$$

TABLE 1

| Color chart (#) | Color difference (NBS unit) |
|---|---|
| 5 | 0+0.5 |
| 4 | 1.5±0.3 |
| 3 | 3.0±0.3 |
| 2 | 6.0±0.7 |
| 1 | 12.0±1.5 |

Key of Table 1.—NBS: National Bureau of Standards.

Note: Various dyes, such as disperse dyes, acid dyes and metal complex dyes, are used for measuring the color grade. Dyeing conditions in the case of each dye are as follows:

(a) A disperse dye:

Celliton Grey BG (registered trademark of Badische Anilin & Soda-Fabrik A.G., Germany) (applied to polyamide fibers). A dye liquid (liquor ratio=1:50) containing Celliton Grey BG of 0.2% O.W.F. (based on the weight of samples to be dyed) and Lyponex LCR (trademark of Lion Oils & Fats Co., Japan, used as a dispersing agent) of 1 g./liter is prepared. Samples are dipped in the liquid. The liquid is then heated from room temperature to the boiling temperature thereof for 45 minutes and thereafter the boiling state is maintained for 60 minutes. Samples are picked up from the liquid, and dried sufficiently in a room atmosphere.

Foron Navy S–2GL (trademark of Sandoz Ltd.; a dye usually applied to polyester fibers). A dye liquid (liquor ratio=1:50) containing Foron Navy S–2GL of 20% O.W.F. and Levergal NTN (trademark of Farbenfabriken Bayer A.G., used as dispersing agent) of 1 g./liter is prepared. Samples are dipped in the liquid. The liquid is then heated from room temperature to the boiling temperature thereof for 45 minutes and thereafter the boiling state is maintained for 90 minutes. Samples are picked up from the liquid and dried sufficiently in a room atmosphere.

(b) Acid dye:

Supranol Cyanine G (trade name of Farbenfabriken Bayer A.G., a dye applied to polyamide fibers). A dye liquid (liquor ratio=1:50) containing Supranol Cyanine G of 0.3% O.W.F. is prepared. The pH of the liquid is adjusted to 4 with acetic acid. Samples are dipped in the liquid. The liquid is then heated from room temperature to the boiling temperature thereof for 45 minutes and thereafter the boiling state is maintained for 60 minutes. Samples are picked up from the liquid, and dried sufficiently in a room atmosphere.

(c) Metal Complex dyes:

Cibalan Grey BL (trademark of Ciba Ltd.). A dye liquid (liquor ratio=1:50) containing Cibalan Grey BL of 1.0% O.W.F., ammonium sulfate of 2.0% O.W.F. and Irgasol SW (trademark of J. R. Geigy S.A., used as dyeing auxiliary) of 1.0% O.W.F. is prepared. Samples are dipped in the liquid. Then, the liquid is heated from room temperature to the boiling temperature thereof for 45 minutes and thereafter the boiling state is maintained for 60 minutes. Samples are picked up from the liquid and dried sufficiently in a room atmosphere.

As shown in Table 2, various embodiments of the heating means of the types shown in FIG. 3 and FIG. 4 were used in the examples of this invention.

TABLE 2

| 1 | 2 | 3 | 4 | 5 | 6 |
|---|---|---|---|---|---|
| a | 600 | 155 | 100 | 5 | 150 |
| b | 600 | 160 | 100 | 5 | 150 |
| c | 600 | 160 | 100 | 5 | 160 |
| d | 600 | 190 | 100 | 5 | 180 |
| e | 600 | 190 | 100 | 5 | 190 |
| f | 600 | 210 | 100 | 5 | 200 |
| g | 600 | 200 | 100 | 5 | 190 |
| h | 600 | 215 | 100 | 5 | 200 |
| i | 600 | 215 | 100 | 5 | 210 |

Key of Table 2:
1. Type of heating means used.
2. Length of heater plate (mm.).
3. Temperature of heater plate (° C.).
4. Diameter of grooved rotary roller (mm.).
5. Distance between the end of heater plate and the grooved rotary roller (mm.).
6. Temperature of grooved rotary roller (° C.).

The cooling means *a* as shown in FIG. 5 was used in the examples, wherein:

Inside diameter of the water passing conduit: 3 mm.
Diameter of the yarn inlet and yarn outlet: 0.5 mm.
Inside diameter of the water supply pipe: 1.5 mm.
Inside diameter of water discharge pipe: 3 mm.
Suction force of suction pump: 740 mm. Hg.
Length of water passing conduit: 1700 mm.
Flow rate of water: 20 ml./min.
Temperature of water used: 15° C.

The cooling means *b* as shown in FIG. 6 and FIG. 7 was used in the examples, wherein:

Diameter of wetted rotatable roller: 3 mm.
Rotation number of wetted rotatable roller: 20 r.p.m.
Length of cooling medium passing conduit: 1500 mm.
Inside diameter of the cooling medium passing conduit: 3 mm.
Depth of yarn passing groove: 2 mm.
Radius of curvature of the cooling medium passing conduit and the yarn passing groove: 2000 meters.
Cooling medium: water.
Flow rate of cooling medium: 30 ml./min.
Temperature of water used: 15° C.

The cooling means *c* as shown in FIG. 8 was used in the examples, wherein:

Inside diameter of spray passing conduit: 5 mm.
Pitch of helical groove: 10 mm./pitch.
Length of the spray passing conduit: 1500 mm.
Diameter of yarn inlet and yarn outlet: 0.5 mm.
Diameter of jet nozzle hole: 0.3 mm.
Gauge pressure of compressed gas: 3 kg./cm.$^2$.
Kind of gas: air.
Inside diameter of water supplying pipe: 0.2 mm.
Flow rate of water: 5 ml./min.
Inside diameter of spray discharge pipe: 4 mm.
Temperature of water used: 15° C.
Temperature of gas used: 18° C.

The cooling means *d* as in FIG. 9 was used in the examples in which:

Inside diameter of yarn guide conduit: 2 mm.
Length of yarn guide conduit: 80 mm.
Outside diameter of the outlet end of the yarn guide conduit: 2.2 mm.
Angle α of the outlet of the yarn guide conduit: 10°
Inside diameter of water supply pipe: 0.3 mm.
Temperature of water used: 15° C.
Flow rate of water: 5 mm./min.
Inside diameter of spray passing conduit: 3 mm.
Length of spray passing conduit: 1200 mm.
Inside diameter of the inlet end of the spray passing conduit: 5.0 mm.
Angle β of the inlet end of the spray passing conduit: 20°.
Inside diameter of the yarn outlet end of the spray passing conduit: 0.5 mm.
Inside diameter of spray discharge pipe: 3 mm.
Inside diameter of the tubular connector: 20 mm.
Distance between the outlet end of yarn guide conduit and the inlet end of spray passing conduit: 0.4 mm.
Inside diameter of compressed gas supply pipe: 6 mm.
Gauge pressure of compressed gas: 2.5 kg./sq. cm.
Kind of gas: air.
Temperature of the gas: 15° C.

As shown in Table 3, various embodiments of a pair of rotary tubes as shown in FIGS. 10 and 11 were used in the examples.

TABLE 3

| 1 | 2 | 3 | 4 | 5 | 6 | 7 | 8 | 9 |
|---|---|---|---|---|---|---|---|---|
| a | 100 | 48 | 40 | Polyurethane | 95 | Circle | 32, 32 | 60 |
| b | 100 | 48 | 40 | do | 85 | do | 50, 50 | 60 |
| c | 100 | 48 | 40 | do | 80 | Ellipse | 40, 30 | 60 |
| d | 100 | 48 | 40 | do | 70 | Circle | 40, 40 | 60 |
| e | 100 | 48 | 40 | Polyneoprene | 80 | Ellipse | 30, 40 | 60 |
| f | 100 | 48 | 40 | Polybutadiene | 80 | Circle | 32, 32 | 60 |
| g | 100 | 48 | 40 | Polychloroprene | 80 | do | 50, 50 | 60 |

Figure 12:
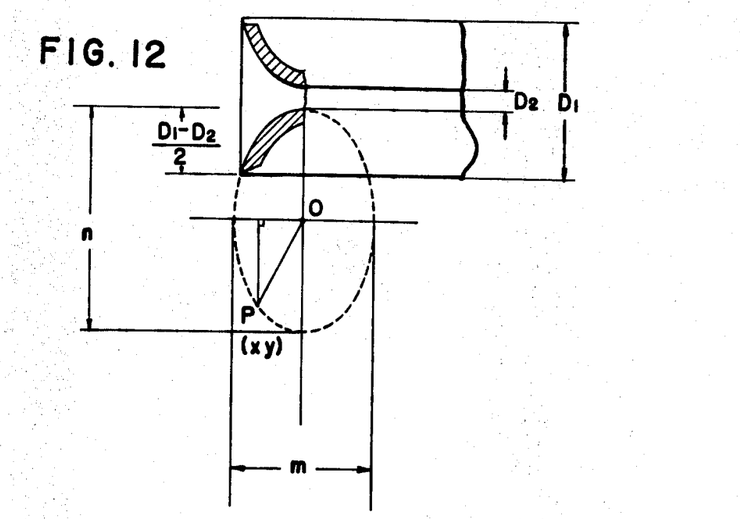
FIG. 12 shows schematically a cross-sectional view of a rotary tube according to the present invention, which shows the curve of the end friction surface of the rotary tube in a plane containing the central axis of the tube.

Key of Table 3:
1. Type of rotary tube used.
2. Length of the rotary tube (mm.).
3. Outside diameter of rotary tube (mm.).
4. Inside diameter of rotary tube (mm.).
5. Material of the friction surface.
6. Hardness of the friction surface.
7. Kind of curve formed by the plane including the central axis of the rotary tube and the friction surface.
8. M and n shown in FIG. 12 (mm.). In FIG. 12, m and n satisfy the equation:

$$\frac{x^2}{m_2} + \frac{y^2}{n^2} = 1$$

9. Distance between the central axis of the one rotary tube and the central axis of the other rotary tube (mm.), the central axis of the one rotary axis is parallel to the central axis of the other rotary axis.

The grooved guide rollers as shown in FIGS. 10 and 11 were used in the examples, the diameter of which was 10 mm. and the depth of the groove of which was 2 mm.

Also, the compressed gas blowing nozzle as shown in FIG. 10 was used in the examples, the diameter of jet hole of which was 0.5 mm.

Figure 13:
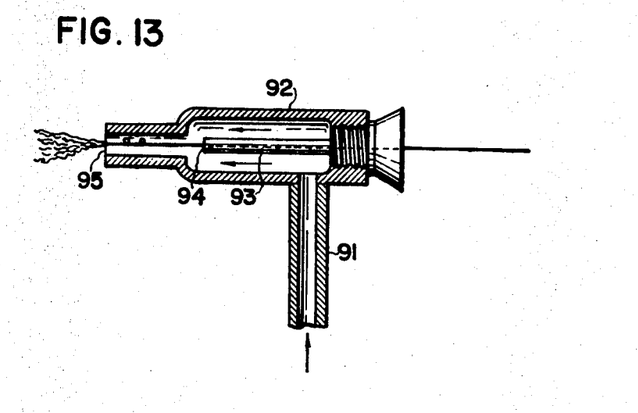
FIG. 13 shows a cross-sectional view of a yarn relaxing and advancing means of the present invention.

Furthermore, the embodiment *a* of the yarn relaxing and advancing means shown in FIG. 13 was used in the examples wherein:

Inside diameter of yarn guide pipe: 3 mm.
Length of the yarn guide pipe: 70 mm.
Inside diameter of compressed gas passing conduit (measured at the portion where the guide pipe positioned): 10 mm.
Inside diameter of the outlet of compressed gas passing conduit: 4 mm.
Length of compressed gas passing conduit: 90 mm.
Inside diameter of compressed gas supply pipe: 6 mm.
Kind of gas used: air.
Temperature of the gas: 15° C.

Figure 14:
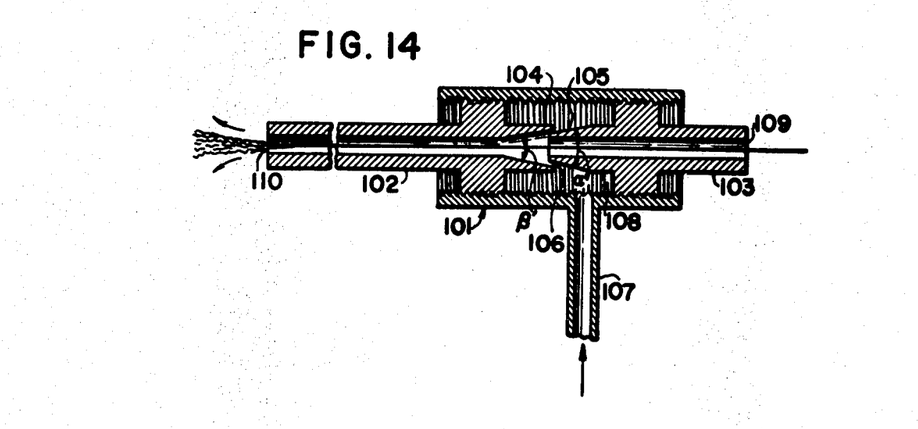
FIG. 14 shows a cross-sectional view of another embodiment of a yarn relaxing and advancing means of the present invention.

The embodiment b of the yarn relaxing and advancing means as shown in FIG. 14 was used in the examples in which:

Inside diameter of yarn guide conduit: 3 mm.
Length of yarn guide conduit: 80 mm.
Outside diameter of the outlet end of the yarn guide conduit: 3.2 mm.
Angle $\alpha'$ of the outlet of the yarn guide conduit: 10°.
Inside diameter of compressed gas passing conduit: 4 mm.
Length of compressed gas passing conduit: 150 mm.
Inside diameter of the inlet end of compressed gas passing conduit: 4.4 mm.
Angle $\beta'$ of the inlet of compressed gas passing conduit: 20°.
Inside diameter of tubular connector: 20 mm.
Distance between the outlet end of the yarn guide conduit and the inlet end of the compressed gas passing conduit: 0.8 mm.
Inside diameter of compressed gas supply pipe: 6 mm.
Kind of gas: air.
Temperature of the gas: 15° C.

EXAMPLES 1 THROUGH 6

In Examples 1 through 6 shown in Table 4A, crimped yarns were produced from undrawn yarns under various operating conditions using the various embodiments shown in FIG. 2, Table 2, Table 3 and also in the above explanations. The results obtained are shown in Table 4B.

TABLE 4A

| | Example Number | | | | | |
|---|---|---|---|---|---|---|
| | 1 | 2 | 3 | 4 | 5 | 6 |
| A | Nylon 6 (250/24) | Nylon 6 (90/6) | Nylon 6 (330/64) | Nylon 66 (330/24) | 1 PET* (270/36) | 2 PEB* (260/36) |
| B | 350 | 370 | 340 | 300 | 330 | 100 |
| C | (¹) | (¹) | (¹) | (¹) | 110 | 98 |
| D | 1,120 | 1,147 | 1,108 | 936 | 1,115 | 347 |
| E | 3.20 | 3.10 | 3.26 | 3.12 | 3.38 | 3.47 |
| F | e | d | e | i | h | d |
| G | 7 | 5 | 7 | 7 | 9 | 3 |
| H | 1,142 | 1,159 | 1,130 | 955 | 1,115 | 350 |
| I | 190 | 188 | 190 | 213 | 312 | 158 |
| J | d | c | a | d | a | d |
| K | 40 | 37 | 42 | 46 | 47 | 35 |
| L | c | f | g | d | a | d |
| M | 29,000 | 28,000 | 30,000 | 28,000 | 29,000 | 21,000 |
| N | 3,430 | 4,300 | 3,100 | 3,350 | 3,400 | 3,320 |
| O | 2.5 | 2.2 | 3.1 | 2.6 | 2.9 | 3.1 |
| P | 1,210 | 1,238 | 1,208 | 1,031 | 530 | 360 |
| Q | b | b | b | b | b | a |
| R | 2.2 | 1.7 | 2.9 | 2.0 | 2.1 | 1.9 |
| S | 1,125 | 1,178 | 1,136 | 961 | 509 | 346 |
| T | 9.0 | 7.0 | 9.0 | 9.0 | 8.5 | 8.5 |

References in column 16.

¹ Not heated.

Key of Table 4A:
 A. Type of undrawn yarn (total deniers/filaments):
  *1. Polyethylene terephthalate.
  *2. Polyethylene oxybenzoate.
 B. Peripheral speed of feed roller (meters/minute).
 C. Temperature of draw pin used (° C.).
 D. Peripheral speed of draw roller (meters/minute).
 E. Drawn ratio.
 F. Type of heating means used.
 G. Passing number of yarn through heating means.
 H. Peripheral speed of a pair of rollers in the heating means (meters/minute).
 I. Temperature of yarn at the outlet of heating means (° C.).
 J. Type of cooling means used.
 K. Temperature of yarn at the yarn outlet of cooling means (° C.).
 L. Type of a pair of rotary tubes used.
 M. Rotation of rotary tube (r.p.m.).
 N. Twisting number imparted temporary to yarn (turns/meter).
 O. Gauge pressure of compressed gas blown onto the friction surface of rotary tube (kg./cm.²).
 P. Peripheral speed of delivery roller (meters/minute).
 Q. Type of yarn relaxing and advancing means used.
 R. Gauge pressure of the compressed gas supplied to the yarn relaxing and advancing means (kg./cm.²).
 S. Peripheral speed of a pair of take up rollers (meters/minute).
 T. Weight of yarn package (kg.).

TABLE 4B

| | | Example Number | | | | | |
|---|---|---|---|---|---|---|---|
| | | 1 | 2 | 3 | 4 | 5 | 6 |
| A | | 13.1 | 5.3 | 18.3 | 12.7 | 6.4 | 4.1 |
| B | | 3.0 | 3.2 | 2.9 | 3.0 | 5.7 | 6.9 |
| C | a | 4.5 | 4.5 | 4.6 | 4.6 | 4.3 | 2.9 |
| | s | 0.2 | 0.2 | 4.6 | 0.3 | 4.3 | 0.4 |
| D | a | 251 | 253 | 248 | 251 | 219 | 180 |
| | s | 4.8 | 5.1 | 4.9 | 5.1 | 4.6 | 5.5 |
| E | a | 93.0 | 92.9 | 93.9 | 93.8 | 91.1 | 90.7 |
| | s | 0.6 | 0.7 | 0.5 | 0.4 | 0.6 | 0.7 |
| F | a | 72.0 | 71.9 | 73.3 | 74.0 | 70.1 | 70.2 |
| | s | 0.5 | 0.5 | 0.6 | 0.7 | 0.4 | 0.7 |
| G | | 0.41 | 0.40 | 0.42 | 0.41 | 0.39 | 0.43 |
| H | | 5.1 | 11.1 | 4.3 | 4.0 | 4.3 | 5.1 |
| I | (1) | 5.0 | 5.0 | 5.0 | 5.0 | 4.5 | 5.1 |
| | (2) | 5.0 | 5.0 | 4.5 | 4.5 | | |
| | (3) | 4.5 | 4.5 | 4.0 | 4.0 | | |
| J | | 77.3 | 29.1 | 98.5 | 81.3 | 80.9 | 76.3 |

Key of Table 4B:
 A. Amount produced (kg./24 hours).
 B. Amount of impurities on friction surface (mg./10 hours). Impurities: textile oil, monomer, oligomers, etc.
 C. Breaking strength of crimped yarn obtained (grams/denier).
 D. Crimp elongation of crimped yarn obtained (percent).
 E. Crimp elasticity of crimped yarn obtained (percent).
 F. Crimp construction rate of crimped yarn obtained (percent)
  In C through G, $a$ is a mean value and $s$ is a standard deviation.
 G. Density of yarn package obtained (grams/cm.).
 H. $d$ value (cm.).
 I. Level dyeing property (color chart Number). In I, (1), (2), and (3), respectively show the level dyeing property of the cases dyed by a disperse dye, an acid dye, and a metal complex dye respectively.
 J. Total deniers of the yarn obtained.

EXAMPLES 7 THROUGH 16

In Examples 7 through 16 shown in Table 5A, crimped yarns were produced from drawn yarns under various operative conditions using various embodiments of the apparatus of this invention described above and shown in FIG. 1, Table 2, and Table 3. The results obtained are shown in Table 5B.

TABLE 5A

| | \_\_\_\_ | \_\_\_\_ | \_\_\_\_ | \_\_\_\_ | Example Number | \_\_\_\_ | \_\_\_\_ | \_\_\_\_ | \_\_\_\_ | \_\_\_\_ |
|---|---|---|---|---|---|---|---|---|---|---|
| | 7 | 8 | 9 | 10 | 11 | 12 | 13 | 14 | 15 | 16 |
| A | Nylon 6 (70/24) | Nylon 6 (70/24) | Nylon 6 (70/24) | Nylon 66 (70/34) | Nylon 66 (70/34) | 1 PET* (75/36) | 1 PET* (30/6) | 3 PEE* (75/24) | 4 PP* (70/36) | Nylon 6 (70/24) |
| B | 1,100 | 1,100 | 1,100 | 1,000 | 1,000 | 1,050 | 1,500 | 1,000 | 600 | 1,100 |
| F | d | d | d | h | h | f | g | d | a | d |
| G | 7 | 7 | 7 | 9 | 9 | 9 | 7 | 5 | 3 | 7 |
| H | 1,122 | 1,122 | 1,122 | 1,015 | 1,015 | 1,060 | 1,515 | 1,010 | 606 | 1,122 |
| I | 190 | 190 | 190 | 214 | 214 | 210 | 200 | 187 | 154 | 190 |
| J | a | a | a | d | d | c | d | d | d | ([15]) a |
| K | 40 | 40 | 40 | 45 | 45 | 46 | 42 | 32 | 31 | 40 |
| L | b | b | b | c | c | a | a | c | g | b |
| M | 28,500 | 28,000 | 28,000 | 29,000 | 29,000 | 30,000 | 27,000 | 27,500 | 23,000 | 28,500 |
| N | 3,450 | 3,450 | 3,450 | 3,500 | 3,500 | 3,480 | 4,200 | 3,390 | 3,280 | 3,450 |
| O | 2.5 | 2.5 | 2.5 | 3.0 | 3.0 | 3.2 | 3.0 | 2.7 | 1.9 | 2.5 |
| P | 1,200 | 1,200 | 1,200 | 1,090 | 1,090 | 1,092 | 1,560 | 1,070 | 630 | 1,200 |
| Q | b | b | b | a | a | b | b | b | b | b |
| R | 2.1 | 1.5 | 3.2 | 2.0 | 1.7 | 2.4 | 1.4 | 2.9 | 1.8 | 2.1 |
| S | 1,128 | 1,128 | 1,128 | 1,025 | 1,025 | 1,048 | 1,500 | 1,020 | 605 | 1,128 |
| T | 7.5 | 7.0 | 8.0 | 7.5 | 8.0 | 8.0 | 7.5 | 7.5 | 6.5 | 7.5 |

[15]. As water to be supplied to the cooling means $a$, water containing 5 percent ethylene glycol was used.

Key of Table 5A:
  A. Type of drawn yarn (total deniers/filament):
   *1. Polyethylene terephthalate.
   *3. Copolyester-ether; copolymer consisting of two different recurring units composed of 50 mol percent ethylene terephthalate units:

and 50 mol percent ethylene-1, 4-diphenoxy butane p, p'-dicarboxylate units:

*4. Polypropylene.
  B. Peripheral speed of feed roller (meters/minute).
  F. Type of heating means used.
  G. Passing number of yarn through heating means.
  H. Peripheral speed of a pair of rollers in the heating means (meter/minute);
  I. Temperature of yarn at the yarn outlet of heating means (° C.).
  J. Type of cooling means used.
  K. Temperature of yarn at the yarn outlet of cooling means (° C.).
  L. Type of a pair of rotary tubes used.
  M. Rotation of rotary tube (r.p.m.).
  N. Twisting number imparted temporary to yarn (turns/meter).
  O. Gauge pressure of compressed gas blown onto the friction surface of rotary tube (kg./cm.$^2$).
  P. Peripheral speed of delivery roller (meters/minute).
  Q. Type of yarn relaxing and advancing means used.
  R. Gauge pressure of the compressed gas supplied to the yarn relaxing and advancing means (kg./cm.$^2$).
  S. Peripheral speed of a pair of take up rollers (meters/minute).
  T. Weight of yarn package (kg.).

TABLE 5B

| | | | | | Example Number | | | | | | |
|---|---|---|---|---|---|---|---|---|---|---|---|
| | | 7 | 8 | 9 | 10 | 12 | 12 | 13 | 14 | 15 | 16 |
| A | | 12.7 | 12.6 | 12.7 | 11.6 | 11.5 | 12.3 | 7.0 | 12.1 | 6.6 | 12.5 |
| B | | 2.7 | 3.0 | 2.6 | 3.1 | 2.9 | 5.7 | 4.3 | 4.9 | 5.1 | 2.0 |
| C | a | 4.4 | 4.5 | 4.6 | 4.6 | 4.7 | 4.1 | 4.2 | 4.2 | 3.9 | 4.3 |
| | s | 0.2 | 0.2 | 0.2 | 0.1 | 0.1 | 0.2 | 0.3 | 0.3 | 0.2 | 0.1 |
| D | a | 226 | 228 | 227 | 233 | 234 | 200 | 205 | 215 | 185 | 230 |
| | s | 5.5 | 228 | 4.8 | 6.0 | 5.9 | 5.7 | 7.1 | 6.1 | 5.2 | 5.0 |
| E | a | 92.0 | 91.8 | 93.1 | 92.1 | 92.9 | 86.2 | 87.4 | 87.0 | 86.1 | 92.6 |
| | s | 0.6 | 0.7 | 0.7 | 0.7 | 0.8 | 0.9 | 0.7 | 0.6 | 0.7 | 0.5 |
| F | a | 70.1 | 70.3 | 71.0 | 70.4 | 70.9 | 67.7 | 67.0 | 68.2 | 65.8 | 71.1 |
| | s | 0.5 | 0.4 | 0.6 | 0.4 | 0.5 | 0.7 | 0.8 | 0.6 | 0.5 | 0.5 |
| G | | 0.42 | 0.47 | 0.40 | 0.42 | 0.46 | 0.41 | 0.43 | 0.46 | 0.44 | 0.41 |
| H | | 4.9 | 8.2 | 4.1 | 4.3 | 7.8 | 4.0 | 13.5 | 9.3 | 7.7 | 4.7 |
| I | (1) | 5.0 | 5.0 | 5.0 | 5.0 | 5.0 | 3.5 | 3.5 | 3.5 | | 3.5 |
| | (2) | 4.0 | 4.0 | 4.5 | 4.5 | 4.5 | | | | | 4.5 |
| | (3) | 3.5 | 3.5 | 4.0 | 4.0 | 3.5 | | | | | 4.0 |

References in column 18.

Key of Table 5B:
  A. Amount produced (kg./24 hours).
  B. Amount of impurities on friction surface (mg./10 hours). Impurities: textile oil, monomer, oligomers, etc.
  C. Breaking strength of crimped yarn obtained (grams/deniers).
  D. Crimp elongation of crimped yarn obtained (percent).
  E. Crimp elasticity of crimped yarn obtained (percent).
  F. Crimp contraction rate of crimped yarn obtained (percent).
    In C through F, $a$ is a mean value and $s$ is a standard deviation.
  G. Density of yarn package obtained (grams/cm.$^3$).
  H. $d$ value (cm.).
  I. Level dyeing property (color chart Number). In I, (1), (2), and (3) respectively show the level of dyeing property of the cases dyed by a disperse dye, an acid dye, and a metal complex dye respectively.

EXAMPLES 17 THROUGH 23

Crimped yarns were produced, in Examples 17 through 23 shown in Table 6A, from undrawn yarns under various conditions using the embodiment which is the same as that shown in FIG. 2 except that the yarn relaxing and advancing means was omitted.

The results are shown in Table 6B.

TABLE 6A

| | Example Number | | | | | | |
|---|---|---|---|---|---|---|---|
| | 17 | 18 | 19 | 20 | 21 | 22 | 23 |
| A | Nylon 6 (250/2A) | Nylon 6 (90/6) | Nylon 6 (350/24) | Nylon 66 (250/34) | 1 PET* (270/36) | 1 PET* (270/36) | 2 PET* (210/36) |
| B | 350 | 370 | 340 | 300 | 330 | 150 | 100 |
| C | (¹) | (¹) | (¹) | (¹) | 110 | 100 | 98 |
| D | 1,120 | 1,147 | 1,108 | 936 | 1,115 | 510 | 347 |
| E | 3.20 | 3.10 | 3.26 | 3.12 | 3.38 | 3.40 | 3.47 |
| F | e | d | e | i | h | i | b |
| G | 7 | 5 | 7 | 7 | 9 | 3 | 3 |
| H | 1,142 | 1,159 | 1,130 | 955 | 1,115 | 515 | 350 |
| I | 190 | 188 | 190 | 213 | 213 | 205 | 158 |
| J | d | c | a | d | a | b | d |
| K | 40 | 37 | 42 | 46 | 47 | 41 | 35 |
| L | c | f | g | d | a | c | d |
| M | 29,000 | 28,000 | 30,000 | 28,000 | 29,000 | 24,000 | 21,000 |
| N | 3,430 | 4,300 | 3,100 | 3,350 | 3,400 | 3,400 | 3,320 |
| Q | 2.5 | 2.2 | 3.1 | 2.6 | 3.0 | 2.9 | 3.1 |
| P | 1,210 | 1,238 | 1,208 | 1,031 | 1,170 | 530 | 360 |
| S | 1,174 | 1,213 | 1,172 | 1,000 | 1,147 | 514 | 353 |
| T | 2.5 | 2.0 | 2.7 | 2.5 | 2.5 | 2.5 | 2.0 |

¹ Not heated.

Key of Table 6A:
  A. Type of undrawn yarn (total deniers/filament):
    * 1. Polyethylene terephthalate.
    * 2. Polyethylene oxybenzoate.
  B. Peripheral speed of feed roller (meters/minute).
  C. Temperature of draw pin used (° C.).
  D. Peripheral speed of draw roller (meters/minute).
  E. Drawn ratio.
  F. Type of heating means used.
  G. Passing number of yarn through heating means.
  H. Peripheral speed of a pair of rollers in the heating means (meters/minute).
  I. Temperature of yarn at the yarn outlet of heating means (° C.).
  J. Type of cooling means used.
  K. Temperature of yarn at the yarn outlet of cooling means (° C.).
  L. Type of a pair of rotary tubes used.
  M. Rotation of rotary tube (r.p.m.).
  N. Twisting number imparted temporary to yarn (turns/meter).
  O. Gauge pressure of compressed gas blown onto the friction surface of rotary tube (kg./cm.²).
  P. Peripheral speed of delivery roller (meters/minute).
  T. Weight of yarn package (kg.).

TABLE 6B

| | | Example Number | | | | | | |
|---|---|---|---|---|---|---|---|---|
| | | 17 | 18 | 19 | 20 | 21 | 22 | 23 |
| A | | 13.5 | 4.9 | 17.6 | 12.0 | 13.5 | 6.3 | 3.9 |
| B | | 3.2 | 3.4 | 3.0 | 3.1 | 5.9 | 7.2 | 7.1 |
| C | a | 4.6 | 4.5 | 4.6 | 4.6 | 4.3 | 4.2 | 3.1 |
| | s | 0.2 | 0.2 | 0.2 | 0.3 | 0.4 | 0.3 | 0.4 |
| D | a | 231 | 250 | 240 | 241 | 205 | 207 | 163 |
| | s | 5.6 | 5.3 | 5.7 | 6.0 | 5.1 | 5.8 | 5.4 |
| E | a | 92.1 | 93.2 | 93.8 | 93.4 | 91.8 | 92.7 | 92.1 |
| | s | 0.6 | 0.7 | 0.6 | 0.4 | 0.5 | 0.4 | 0.6 |
| F | a | 71.2 | 71.4 | 72.7 | 72.3 | 69.6 | 71.4 | 69.5 |
| | s | 0.6 | 0.5 | 0.6 | 0.7 | 0.5 | 0.4 | 0.6 |
| G | | 0.77 | 0.79 | 0.74 | 0.72 | 0.71 | 0.70 | 0.72 |
| H | | 24.1 | 28.5 | 21.9 | 23.2 | 23.7 | 26.8 | 27.4 |
| I | (1) | 5.0 | 5.0 | 5.0 | 5.0 | 5.0 | 5.0 | 5.0 |
| | (2) | 4.5 | 5.0 | 5.0 | 5.0 | 4.5 | | |
| | (3) | 4.5 | 4.5 | 4.5 | 4.5 | 4.5 | | |
| J | | 77.1 | 28.9 | 99.5 | 80.2 | 79.7 | 79.5 | 75.3 |

References in column 20.

Key of Table 6B:
  A. Amount produced (kg./24 hours).
  B. Amount of impurities on friction surface (mg./10 hours).
  C. Breaking strength of crimped yarn obtained (grams/denier).
  D. Crimped elongation of crimped yarn obtained (percent).
  E. Crimp elasticity of crimped yarn obtained (percent).
  F. Crimp contraction rate of crimped yarn obtained (percent). In C through G, $a$ is a mean value and $s$ is a standard deviation.
  G. Density of yarn package obtained (grams/cm.).
  H. $d$ value (cm.).
  I. Level dyeing property (color chart number 1). In I, (1), (2) and (3) respectively show the level dyeing property of the cases dyed by a disperse dye, an acid dye, and a metal complex dye respectively.
  J. Total deniers of the yarn obtained.

EXAMPLES 24 THROUGH 34

In Examples 24 through 34 shown in Table 7A, crimped yarns were produced from drawn yarns under various operating conditions using the apparatus of this invention which was the same as that shown in FIG. 1 except that the yarn relaxing and advancing means was omitted. The results obtained are shown in Table 7B.

TABLE 7A

| | Example Number | | | | | | | | | | |
|---|---|---|---|---|---|---|---|---|---|---|---|
| | 24 | 25 | 26 | 27 | 28 | 29 | 30 | 31 | 32 | 33 | 34 |
| A | Nylon 6 (70/24) | Nylon 6 (70/24) | Nylon 6 (70/24) | Nylon 6 (70/24) | Nylon 66 (70/34) | Nylon 66 70/34) | Nylon 66 (70/34) | Nylon (70/34) | ¹ PET* (75/36) | ¹ PET* (75/6) | 6 PAN* (75/38) |
| B | 1,100 | 1,100 | 1,100 | 1,100 | 1,000 | 1,000 | 1,000 | 1,000 | 1,050 | 1,500 | 600 |
| F | d | d | d | d | h | h | h | h | f | g | c |
| G | 7 | 7 | 7 | 7 | 9 | 9 | 9 | 9 | 9 | 7 | 3 |
| H | 1,122 | 1,122 | 1,122 | 1,122 | 1,015 | 1,015 | 1,015 | 1,015 | 1,060 | 1,515 | 600 |
| I | 190 | 190 | 190 | 190 | 214 | 214 | 214 | 214 | 210 | 200 | 159 |
| J | a | a | a | a | d | a | b | c | c | d | b |
| K | 40 | 40 | 40 | 40 | 45 | 45 | 55 | 47 | 46 | 42 | 39 |
| L | b | b | b | b | c | c | c | c | a | a | e |
| M | 28,500 | 28,500 | 28,500 | 28,500 | 29,000 | 29,000 | 29,000 | 29,000 | 36,000 | 27,000 | 21,000 |
| N | 3,450 | 3,450 | 3,450 | 3,450 | 3,500 | 3,500 | 3,500 | 3,500 | 3,480 | 4,200 | 3,100 |
| O | 2.5 | 0.5 | 4.0 | 6.0 | 3.0 | 3.0 | 3.0 | 3.0 | 3.2 | 3.0 | 2.7 |
| P | 1,200 | 1,200 | 1,200 | 1,200 | 1,090 | 1,090 | 1,090 | 1,090 | 1,092 | 1,560 | 625 |
| S | 1,165 | 1,190 | 1,140 | 1,140 | 1,067 | 1,065 | 1,080 | 1,065 | 1,070 | 1,510 | 620 |
| T | 2.0 | 1.0 | 2.5 | 2.5 | 2.5 | 2.5 | 2.0 | 2.5 | 2.0 | 1.5 | 1.5 |

Key of Table 7A:
A. Type of drawn yarn (total denier/filament):
   *1. Polyethylene terephthalate and polyethylene oxybenzoate.
   *6. Polyacrylonitrile.
B. Peripheral speed of feed roller (meters/minute).
F. Type of heating means used.
G. Passing number of yarn through heating means.
H. Peripheral speed of a pair of rollers in the heating means (meters/minute).
I. Temperature of yarn at the yarn outlet of heating means (° C.);
J. Type of cooling means used.
K. Temperature of yarn at the yarn outlet of cooling means (° C.).
L. Type of a pair of rotary tubes used.
M. Rotation of rotary tube (r.p.m.).
N. Twisting number imparted temporary to yarn (turns/meter).
O. Gauge pressure of compressed gas blown onto the friction surface rotary tube (kg./cm.²).
P. Peripheral speed of delivery roller (meters/minute).
S. Peripheral speed of a pair of take up rollers (meters/minute).
T. Weight of yarn package (kg.).

TABLE 7B

| | | Example Number | | | | | | | | | | |
|---|---|---|---|---|---|---|---|---|---|---|---|---|
| | | 24 | 25 | 26 | 27 | 28 | 29 | 30 | 31 | 32 | 33 | 34 |
| A | | 12.2 | 12.1 | 12.3 | 12.2 | 11.0 | 11.1 | 11.0 | 11.3 | 11.9 | 6.8 | 6.9 |
| B | | 3.0 | 3.0 | 3.0 | 3.0 | 3.1 | 2.8 | 10.0 | 3.5 | 6.0 | 4.0 | 12.0 |
| C | a | 4.6 | 4.4 | 4.6 | 4.6 | 4.7 | 4.6 | 4.6 | 4.5 | 4.2 | 4.1 | 3.2 |
| | s | 0.2 | 0.2 | 0.2 | 0.2 | 0.1 | 0.1 | 0.4 | 0.3 | 0.3 | 0.2 | 0.5 |
| D | a | 224 | 215 | 225 | 227 | 230 | 220 | 200 | 222 | 195 | 210 | 120 |
| | s | 6.5 | 6.4 | 6.3 | 5.9 | 6.0 | 5.9 | 11.0 | 6.1 | 8.8 | 5.9 | 20.1 |
| E | a | 91.6 | 92.0 | 93.0 | 92.5 | 91.5 | 93.2 | 92.8 | 92.1 | 85.9 | 86.4 | 82.2 |
| | s | 0.7 | 0.8 | 0.6 | 0.7 | 0.6 | 0.7 | 1.3 | 0.9 | 0.9 | 0.8 | 3.1 |
| F | a | 69.1 | 68.0 | 69.9 | 69.5 | 69.4 | 70.1 | 67.1 | 68.9 | 66.3 | 65.2 | 64.1 |
| | s | 0.7 | 0.5 | 0.7 | 0.6 | 0.6 | 0.6 | 0.9 | 0.8 | 0.8 | 0.7 | 0.9 |
| G | | 0.79 | 0.81 | 0.79 | 0.80 | 0.76 | 0.78 | 0.90 | 0.81 | 0.90 | 0.89 | 0.90 |
| H | | 21.3 | 25.1 | 22.9 | 22.1 | 24.4 | 22.3 | 21.8 | 24.5 | 25.6 | 28.1 | 26.0 |
| I | (1) | 5.0 | 5.0 | 5.0 | 5.0 | 5.0 | 5.0 | 5.0 | 5.0 | 3.5 | 4.0 | |
| | (2) | 4.5 | 4.0 | 5.0 | 4.5 | 4.0 | 4.0 | 4.0 | 4.5 | 4.5 | | |
| | (3) | 4.0 | 3.5 | 3.5 | 3.5 | 4.0 | 3.5 | 4.0 | 4.0 | | | |

Key of Table 7B:
A. Amount produced (kg./24 hours).
B. Amount of impurities on friction surface (mg./10 hours). Impurities: textile oil, monomer, oligomers, etc.
C. Breaking strength of crimped yarn obtained (grams/deniers).
D. Crimp elongation of crimped yarn obtained (percent).
E. Crimp elasticity of crimped yarn obtained (percent).
F. Crimp contraction rate of crimped yarn obtained (percent). In C through F, $a$ is a mean value and $s$ is a standard deviation.
G. Density of yarn package obtained (grams/cm.).
H. $d$ value (cm.).
I. Level dyeing property (color chart number). In I, (1), (2) and (3) respectively show the level dyeing property of the cases dyed by a disperse dye, an acid dye, and a metal complex dye respectively.

EXAMPLE 35

Two crimped yarns having oppositely directed torques obtained under the conditions which are the same as those in Example 1 were passed together through yarn loosening and advancing means 10 (used type $b$) and rolled up into yarn package 12 of 9 kg. in yarn package weight by means of a pair of take up rollers 11. (The gauge pressure of a compressed gas supplied to the yarn loosening and advancing means was 2.4 kg./sq. cm. and the peripheral speed of the take up rollers was 1120 meters/minute.)

Figure 15:
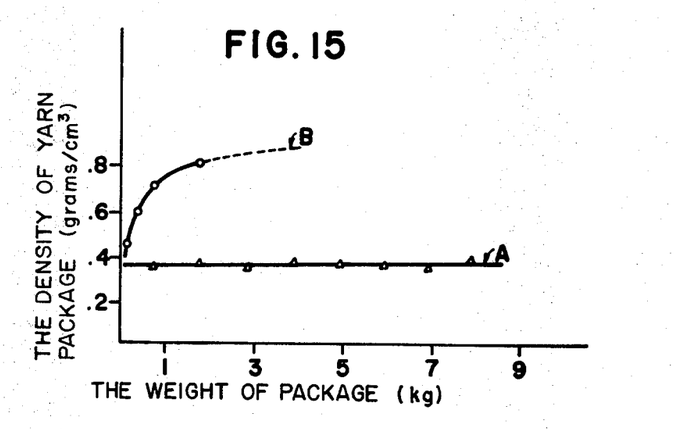
FIG. 15 shows a diagram illustrating the relation between the weight of yarn package and the density of yarn package.

Also, the yarn package density of the double yarn obtained was 0.38 gram/cm.³ and a $d$ value was 4.3 cm. The double yarn obtained had the same cohesion properties as that of the plyed yarn having an ordinary plyed twist of 100 turns/meter prepared by entwisting two yarns having oppositely directed torques. After unrolling 1 kg. of the yarn from the yarn package of 9 kg., the density of the remaining yarn package was measured. The same procedure was repeated successively until the yarn package became empty. This result is shown in FIG. 15 as curve A. Furthermore, the variation of the yarn package density measured similarly about the yarn package obtained without using the yarn loosening and advancing means is shown in FIG. 15 as curve B.

While the invention has been particularly shown and described with reference to a preferred embodiment thereof, it will be understood by those skilled in the art that various changes in form and details may be made therein without departing from the spirit and scope of the invention.

What is claimed is:

1. A process for producing a crimped yarn comprising the steps of:
   (a) heating a traveling thermal-plastic synthetic yarn at or above the softening temperature of the yarn,
   (b) cooling the yarn below the secondary transition temperature of the yarn,
   (c) false-twisting the yarn by contacting the yarn with a moving friction surface, and
   (d) cooling forceably the moving friction surface, whereby the generation of heat is prevented.

2. The process of claim 1 wherein the yarn is made of a member of the group consisting of polyamide, polyester, polyacrylonitrile, polyolefin, and a mixture thereof.

3. The process of claim 1 wherein the yarn is a drawn yarn continuously fed from a drawing step.

4. The process of claim 1 wherein the yarn is heated at or above the softening temperature of the yarn by passing at least twice through one heating zone.

5. The process of claim 1 wherein the moving friction surface is a surface of each end of a rotary tube rotating around the central axis.

6. The process of claim 5 wherein the surface of each end of the rotary tube forms a curve being a part of a member of the group consisting of circle, ellipse, parabola, cycloidal curve, power series curve, hyperbola and logarithmic curve at a plane containing the central axis of the rotary tube, said curve being convex to the central axis.

7. The process of claim 5 wherein the heated and twisted yarn is cooled below the secondary transition temperature of the yarn by being contacted with a wetted rotatable roller, said roller being immersed partially in a water bath, and thereafter passing along a passageway provided to the outside surface of a cooling medium passing conduit.

8. The process of claim 7 wherein the cooling medium passing through the cooling medium passing conduit is water.

9. The process of claim 7 wherein the yarn passageway is curved.

10. The process of claim 1 wherein the heated and twisted yarn is cooled below the secondary transition temperature of the yarn by passing through running water.

11. The process of claim 10 wherein the water contains a scouring agent.

12. The process of claim 11 wherein the scouring agent is ethylene glycol.

13. The process of claim 1 wherein the heated and twisted yarn is cooled below the secondary transition temperature of the yarn by passing through flowing spray.

14. The process of claim 13 wherein the flowing spray contains a scouring agent.

15. The process of claim 1 wherein the moving friction surface is cooled by means of a jet of compressed gas.

16. The process of claim 15 wherein the compressed gas has a pressure of 0.5–4 kg./cm.$^2$ in gauge.

17. The process claimed in claim 15 where the compressed gas is air.

18. A process for producing a crimped yarn comprising the steps of:
   (a) heating a traveling thermal-plastic synthetic yarn at or above the softening temperature of the yarn,
   (b) cooling the yarn below the secondary transition temperature of the yarn,
   (c) false-twisting the yarn by contacting the yarn with a moving friction surface,
   (d) cooling forceably the moving friction surface, whereby the generation of heat is prevented,
   (e) relaxing and advancing the untwisted yarn while overfeeding by means of a jet of compressed gas.

19. The process of claim 18 wherein the compressed gas jetted has a pressure of 0.5–4 kg./cm.$^2$ in gauge.

20. An apparatus for producing a crimped yarn comprising:
   (a) a heating means for heating a traveling thermal-plastic synthetic yarn,
   (b) at least one rotary tube rotating around the center axis thereof, said yarn being false-twisted by contacting with a friction surface of each end of said rotary tube,
   (c) a cooling means located between said heating means and said rotary tube for cooling the heated yarn before the yarn is untwisted, and
   (d) a compressed gas jetting nozzle placed facing said friction surface.

21. The apparatus of claim 20 wherein the heating means is composed of a pair of rollers placed apart each other and a heater plate placed between said rollers.

22. The apparatus of claim 21 wherein the rollers are rotary rollers.

23. The apparatus of claim 20 wherein the cooling means is composed of a wetted rotatable roller being immersed partially in a water bath and a cooling medium passing conduit having a yarn passageway at the outside surface thereof.

24. The apparatus of claim 20 wherein the cooling means is composed of:
   (a) a spray passing conduit having a yarn inlet and a yarn outlet and a helical groove at the inside wall thereof,
   (b) a spray supplying pipe located at said yarn inlet side for supplying a spray to said spray passing conduit, and
   (c) a spray discharging pipe located at said yarn outlet side.

25. The apparatus of claim 20 wherein the cooling means is composed of:
   (a) a tubular connector having a compressed gas supplying pipe,
   (b) a spray passing conduit screwed into said tubular connector to such an extent that at least a yarn and spray inlet thereof is positioned at the inside of said tubular connector, the inside surface of said spray passing conduit at the inlet section being tapered to the traveling direction of yarn, the inside diameter of a yarn outlet of said spray passing conduit being one capable of passing said yarn therethrough, and said spray passing conduit having a spray discharging pipe at the outlet side thereof, and
   (c) a yarn guiding conduit for guiding a yarn to said spray passing conduit screwed into said tubular connector to such an extent that at least one yarn outlet of said yarn guiding conduit is positioned at the inside of said tubular connector with a narrow space between said outlet and the inlet of said spray passing conduit, the outside surface of said yarn guiding conduit at the yarn outlet section being tapered to the traveling direction of yarn, and said yarn guiding conduit having a water supplying pipe for supplying water into said conduit.

26. The apparatus of claim 20 wherein the surface of each end of the rotary tubes forms a curve being a part of a member of the group consisting of circle, ellipse, parabola, cycloidal curve, hyperbola, logarithmic curve and at a plane containing the central axis of the rotary tube, said curve being convex to said central axis.

27. The apparatus of claim 19 wherein two rotary tubes are employed.

28. The apparatus of claim 27 wherein said two rotary tubes are rotated to opposite directions with each other.

29. The apparatus of claim 20 which contains grooved guide rollers for defining the passageway of the yarn passing while being contacted with the friction surface of the rotary tube.

30. The apparatus of claim 20 wherein the diameter of the compressed gas jetting nozzle is from 0.05 to 3.00 mm.

31. An apparatus for producing a crimped yarn comprising:
 (a) a heating means for heating the traveling thermalplastic synthetic yarn,
 (b) at least one rotary tube rotating around the center axis thereof, said yarn being false-twisted by contacting with a friction surface of each end of said rotary tube,
 (c) a cooling means located between said heating means and said rotary tube for cooling the heated and twisted yarn before the yarn is untwisted,
 (d) a compressed gas jetting nozzle placed facing said friction surface, and
 (e) a yarn relaxing and advancing means for advancing the untwisted yarn in a relaxed state, said relaxing and advancing means jetting a compressed gas in the traveling direction of the untwisted yarn.

32. The apparatus of claim 31 wherein the yarn relaxing and advancing means is composed of:
 (a) a compressed gas supplying pipe,
 (b) a gas passing conduit through which the compressed gas supplied from said compressed gas supplying pipe passes to the outlet, and
 (c) a yarn guiding pipe for guiding the traveling yarn into said gas passing conduit.

33. The apparatus of claim 31 wherein the yarn relaxing and advancing means is composed of:
 (a) a tubular connector having a compressed gas supplying pipe,
 (b) a compressed gas passing conduit screwed into said tubular connector to such an extent that at least the yarn and compressed gas inlet thereof is positioned at the inside of said tubular connector, the inside surface of said compressed gas passing conduit at the inlet section being tapered to the traveling direction of said yarn, and
 (c) a yarn guiding conduit for guiding said yarn to said compressed gas passing conduit screwed at the inside of said tubular connector to such an extent that at least the yarn outlet of said yarn guiding conduit is positioned at the inside of said tubular connector with a narrow space between said outlet and the inlet of said compressed gas passing conduit, the outside surface of said yarn guiding conduit at the yarn outlet section being tapered in the traveling direction of yarn.

References Cited

UNITED STATES PATENTS

| | | | |
|---|---|---|---|
| 2,936,570 | 5/1960 | Arthur et al. | 57—157 |
| 3,029,591 | 4/1962 | Scragg et al. | 57—157 |
| 3,327,461 | 6/1967 | Wyatt | 57—77.4 XR |
| 3,449,898 | 6/1969 | Fujita et al. | 57—34 |

FOREIGN PATENTS 645,820   9/1962   Italy.

DONALD E. WATKINS, Primary Examiner

U.S. Cl. X.R.

57—77.4, 157; 28—62